Dec. 6, 1938.  R. E. WEDGE ET AL  2,139,531
CUT-OUT FOR SPLIT PHASE MOTORS
Original Filed July 8, 1935
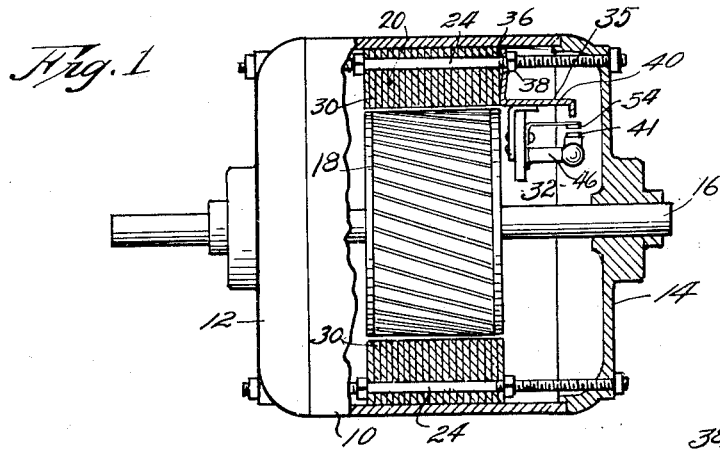
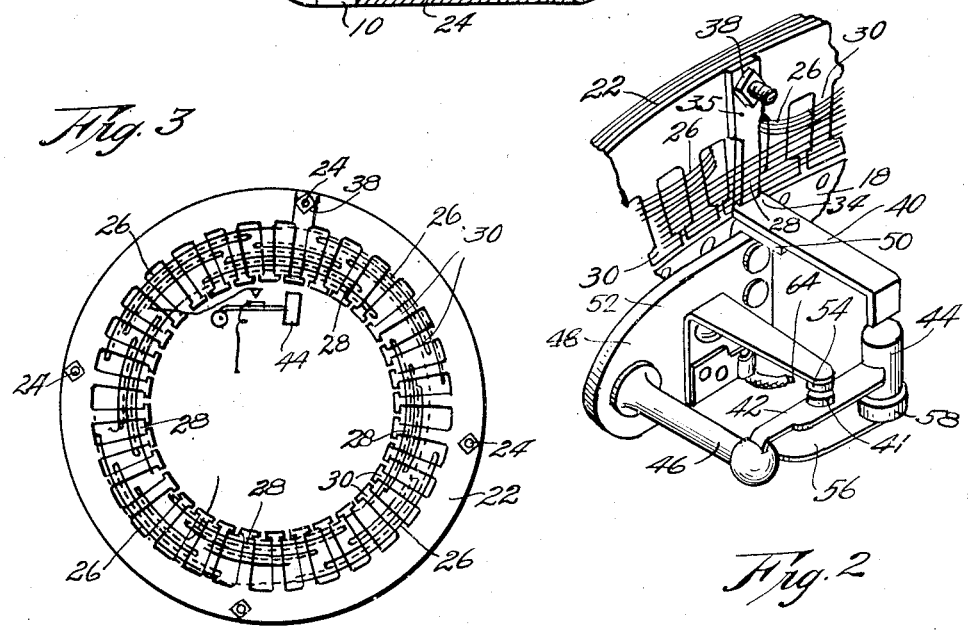
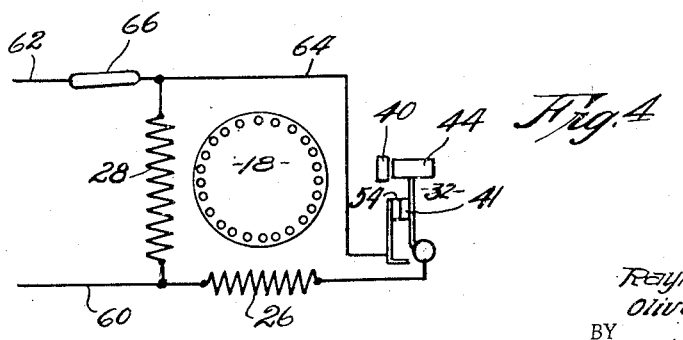
INVENTORS,
Raymond E. Wedge
Oliver C. Turner.
BY
Hovey & Hamilton,
ATTORNEYS.

Patented Dec. 6, 1938

2,139,531

UNITED STATES PATENT OFFICE 2,139,531

CUT-OUT FOR SPLIT PHASE MOTORS

Raymond E. Wedge and Oliver C. Turner, Kansas City, Mo.; said Oliver C. Turner assignor to Elder B. Switzer, Kansas City, Mo.

Application July 8, 1935, Serial No. 30,246
Renewed March 14, 1938

1 Claim. (Cl. 172—279)

This invention relates to improvements in electric motors and particularly to a simple, efficient and inexpensive starting circuit control device for split phase motors.

Another object of the present invention is the provision of cut-out switch for the starting winding of a split phase motor operable by the magnetic flux set up in the stator frame.

A further object is to provide a circuit control for split phase motors or the like, operable by the variation of the magnetic flux in the stator frame due to the variation in the rate of speed of the rotor.

Other objects and advantages of the present invention will be apparent from the following specification wherein reference is had to the drawing wherein is shown the preferred embodiment of the invention.

In the drawing:

Figure 1 is an elevation of an electric motor partially in elevation embodying this invention.

Fig. 2 is a fragmentary, enlarged perspective view of the cut-out switch or circuit breaker together with its associated parts.

Fig. 3 is a diagrammatical view of the stator frame and the starting and running winding with relation to the preferred position of the switch member.

Fig. 4 is a wiring diagram of the stator of the motor.

Like reference characters represent similar parts throughout the several views. The motor is shown more or less diagrammatically and is of the split phase type. The numeral 10 designates a motor casing having end plates 12 and 14 in which the centrally disposed motor shaft 16 is rotatably mounted. Shaft 16 carries the rotor 18 of the squirrel-cage type. The stator 20 consists of a laminated frame 22, which is securely held in stationary relation to casing 10 by means of bolts 24, the starting winding 26, and running winding 28. The starting and running windings are disposed about certain of the stator teeth 30 in over-lapped relation as shown in Figs. 2 and 3. The running windings 28 as shown are separately disposed in 90 degree sectors of the stator frame, while the starting windings 26 are of like number and disposed centrally between adjacent running coils. In the present stator winding, it is apparent that the greatest flux produced in the stator frame as the circuit is applied to the motor will be substantially at the central portion of the different running coils. In certain instances this condition might be varied, due to the relative currents carried by the starting and running windings. It is one of the purposes of the present invention to position the switch or cut-out in operative relation with the stator frame at a point of relative high magnetic flux in order to more accurately operate the switch parts within a predetermined range of speed of the rotor. This point of attachment as shown is substantially at the peripheral center of one of the running windings. It is to be understood however, that the positioning of the switch is not to be limited to any particular position since in order to operate the switch as contemplated, it is only necessary to overcome certain mechanical resistances that may be varied by simple changes in the switch mechanism which are well known in the art.

The switch mechanism 32 as shown, comprises an angled member 34, one leg 35 of which is positioned radially across the face of the stator frame 22 and in direct contact therewith. The stator bolt 24 which is a part of the motor is adapted to be passed through the opening 36 in 34 and the nut 38 set to secure 34 and 22 in fixed relation. Leg 35 extends inwardly to the inner end of the tooth 30 on which it rests and is provided with an out-turned portion 40 which extends substantially parallel with the axis of the motor.

This member 34 is made of a magnetic material suitable for carrying the magnet flux of the stator frame to operate a spring mounted switch contact member 42 having a pole member 44 positioned in magnetic operative relation with the member 40 and a contact point 41. The member 42 is carried by 34 through the intermediacy of the post 46, insulating plate 48 and angled member 50 which is preferably made of a non-magnetic material. Carried by plate 48 is a resilient arm 52 having a contact point 54 positioned adjacent point 41 but normally separated therefrom by the action of spring 42. A resilient member 56 carrying at its outer end a cushioning pad 58 is adapted to serve as a stop for 44.

In Fig. 4 is shown a diagram of the wiring of the motor. One of the line wires 60 is connected with running winding 28 and starting winding 26, while the other line wire 62 is connected with running winding 28 and to one contact point 54 through wire 64. Contact point 54 is in operative relation with point 41 which is connected with starting winding 26. A switch 66 in line 62 serves to control the current to the motor.

The operation of the invention is as follows:

The full load starting torque of the motor is greater than the full load running torque and it is, therefore, important that at the starting period, that a greater pull be exerted on the rotor by the added current passing through the starting windings; however, when a predetermined speed is attained by the rotor, then it becomes necessary to cut out the starting windings by means of a switch operable by the relative speed of the rotor and permit the motor to operate on the running windings alone. It is a well known fact that during the starting period a greater magnetic flux is set up in the stator frame than is set up during the running operation, and it is on this differential of magnetic flux in the stator frame that the proper operation of the cut-out switch for the starting coil is operated.

When the switch 66 is closed, current passing to the motor sets up a sufficient magnetic flux in the stator frame and the member 40 to move 44 against the action of spring 42 and close contact points 41 and 54 thereby closing the circuit through the starting winding 26. As the speed of the rotor 18 increases to a predetermined rate, the force exerted by the magnetic flux of the stator frame will decrease to such a degree that the pull of the spring 42 will be sufficient to overcome the magnetic pull of 40 and 44 will be returned to its normal position and contact points 41 and 54 will be separated, thus cutting out the starting windings, then the motor will operate on the running windings alone.

It is apparent that many changes might be made in the general construction of the elements entering into the operation of this motor control without departing from the spirit of the appended claims. Among these elements might be mentioned spring 42 which may be varied in strength to exert any desired amount of resistance against movement, thereby determining to a certain degree the amount of magnetic pull necessary to close contact points 41 and 54.

Also, since the magnetic flux at different points on the stator frame varies, due to the position of the winding on the stator, the magnetic pull of the member 40 might be determined by its position on the stator frame. Variation of the relative size and turns of the starting and running windings would also operate to cause different results in the operation of the switch.

It is evident that the shape of the member 40 is designed to facilitate the convenient positioning of the switch parts and is not necessarily so constructed to properly carry the magnetic flux. It is only essential that element 44 be positioned to be acted upon by the magnetic flux set up in the teeth of the stator frame. Furthermore, this switch 32 might be positioned otherwise than shown without departing from the spirit of the invention. When point 41 contacts point 54 it will be observed that 44 is positioned in spaced relation with 40.

While the form of embodiment of the present invention as herein disclosed constitutes the preferred form of the invention, it is to be understood that other forms might be adopted, which would also come within the scope of the appended claim.

Having thus described the invention, what is claimed as new and desired to be secured by Letters Patent is:

In a split phase motor having a stator frame provided with a plurality of radially disposed teeth arranged in an annular path circumscribing the longitudinal axis of the motor, a starting winding divided into coils supported by said teeth, a running winding divided into coils supported by said teeth, a rotor magnetically associated with all of said windings, and conductors extending from a source of power to said starting and running windings, the combination of a switch structure, mounted on the stator frame and adapted to cut out the starting windings when the magnetic flux of the stator frame decreases to a predetermined point, comprising a radially extending member of magnetic material secured to one of the teeth of said stator frame at the peripheral center of one of said running winding coils and between two of said starting winding coils; a plate of insulating material secured to said member; a switch point carried by the said plate of insulating material; a resilient switch member anchored at one end to said plate of insulating material and having a weight serving as a pole member at the other end thereof, said weight being in proximity to the said radially extending member but normally held away therefrom by the said resilient switch member; a yieldable stop on the said plate to limit the movement of said weight away from the radially extending member of magnetic material; and a contact point on the resilient switch member movable against and from the first mentioned contact point as the said weight is actuated through the change in magnitude of the magnetic flux in said radially extending member.

RAYMOND E. WEDGE.
OLIVER C. TURNER.